United States Patent [19]
Poggemiller et al.

[11] 4,176,721
[45] Dec. 4, 1979

[54] DEPTH CONTROL FOR GROUND WORKING AGRICULTURAL IMPLEMENTS

[75] Inventors: Erhard Poggemiller, Luseland; Ralph Sweet, Forgan, both of Canada

[73] Assignees: Kep Enterprises, Luseland; Sweet Manufacturing Ltd., Forgan, both of Canada

[21] Appl. No.: 855,277

[22] Filed: Nov. 28, 1977

[30] Foreign Application Priority Data

Nov. 30, 1976 [GB] United Kingdom ............... 49825/76

[51] Int. Cl.² ......................................... A01B 63/114
[52] U.S. Cl. ......................................... 172/4; 172/572
[58] Field of Search ............... 172/4, 7, 9, 26, 264, 172/265, 551, 570, 572, 573, 574, 657, 705, 707, 708, 710, 184, 186, 187; 180/79, 131; 280/87.2; 104/244.1

[56] References Cited

U.S. PATENT DOCUMENTS

| | | | |
|---|---|---|---|
| 1,047,644 | 12/1912 | James | 104/244.1 |
| 1,526,639 | 2/1925 | Leebold | 172/574 |
| 1,653,760 | 12/1927 | Carey | 172/551 |
| 2,486,442 | 11/1949 | Silver | 172/186 |
| 3,627,053 | 12/1971 | Hook et al. | 172/9 |
| 3,658,133 | 4/1972 | Sweet et al. | 172/4 |

FOREIGN PATENT DOCUMENTS 249125 2/1964 Australia ................... 172/26

Primary Examiner—Richard T. Stouffer
Attorney, Agent, or Firm—Stanley G. Ade

[57] ABSTRACT

A depth control device is attached to agricultural implements such as cultivators, seed drills, discers and the like, in order to control, within pre-determined limits, the depth of penetration of the earth working components. It comprises firstly a ground or surface engaging sensing member extending forwardly of the framework and secondly, a sensor that is connected to the earth working components. Both of these sensors are connected to mechanism to raise and lower the earth working components which controls the depth of penetration thereof so that, for example, if uneven ground is encountered, the depth penetration is corrected and if the density changes of the ground being worked, thus affecting the suction, then once again depth penetration is corrected. Structure is provided to average out the effect of conditions changing the depth of penetration so that the desired average depth of penetration is maintained particularly in relatively wide machines. Switches are actuated by the sensors and these switches are connected to solenoids or solenoid valves which in turn operate the raising and lowering mechanism for the earth working components, the mechanism being operated either by hydraulic rams or reversible electric or hydrostatic motors.

10 Claims, 7 Drawing Figures

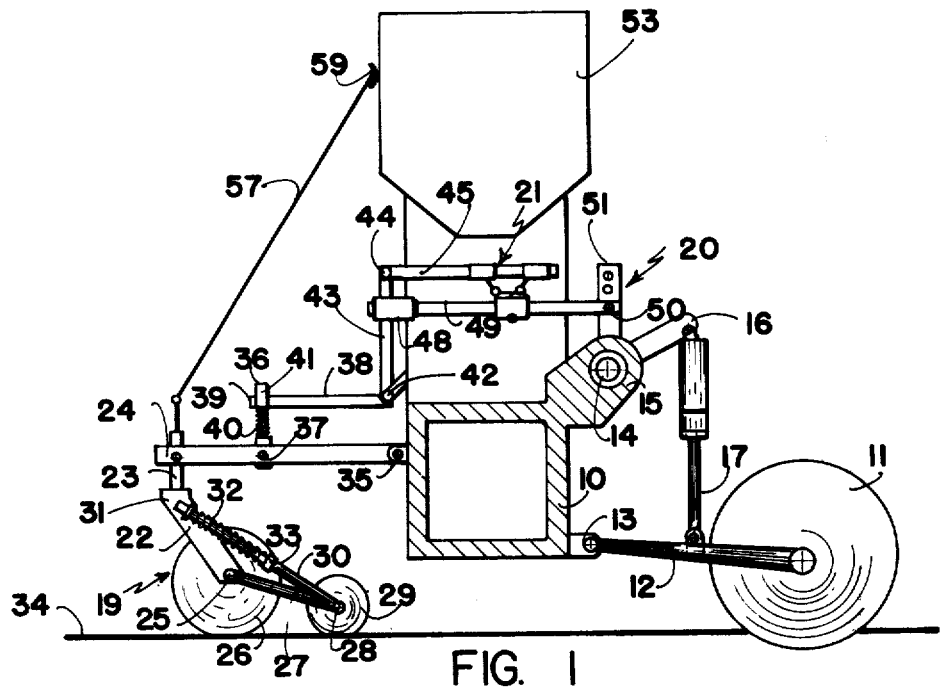
FIG. 1
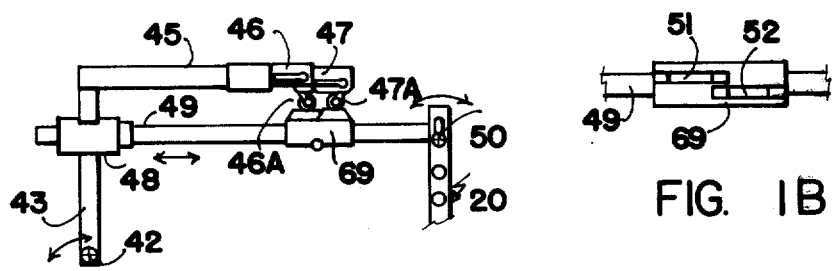
FIG. 1A
FIG. 1B
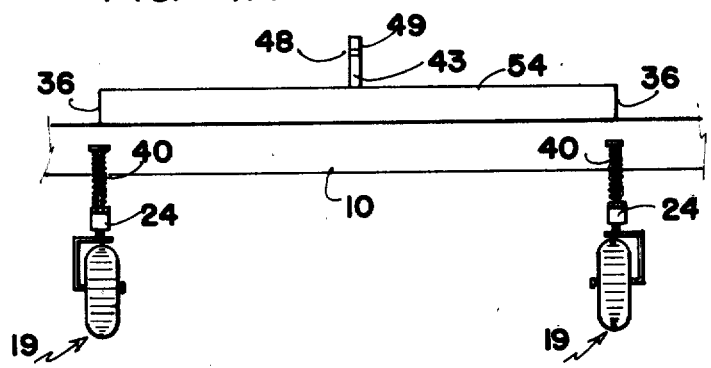
FIG. 2

DEPTH CONTROL FOR GROUND WORKING AGRICULTURAL IMPLEMENTS

BACKGROUND OF THE INVENTION

This invention relates to new and useful improvements in depth control means particularly adapted for use with agricultural implements such as cultivators, seed drills and discers and also with underground harvesters such as onion harvesters, sugar beet harvesters, potato harvesters, planters or seeders of the above as well.

It is well known, particularly in seeding operations, that the subsequent yield will be improved if the seed can be planted as close to the optimum depth as possible.

Under perfect conditions, of course, the seed can be placed the exact amount below the surface of the ground, but in actual practice, many factors affect the depth at which the seed is planted.

For example, uneven ground surface will cause the furrow openers to vary relative to the surface of the ground so that the seed will not be deposited at an even depth. When using relatively wide implements such as discers, the depth is maintained in part by the suction of the discs engaging the earth and if the density of the earth varies, then the suction will vary so that the depth at which the discs are working will also vary.

Furthermore, the seed boxes are usually mounted upon the implement and the weight acting upon the implement therefore varies as the seed quantity in the box varies once again affecting the depth of penetration of the furrow openers.

Also of importance in controlling the depth of penetration of the furrow opener, is the angle of inclination of the ground. For example, if working in one direction on a side hill, then the depth of penetration will be different than if the machine was working in the opposite direction or upon flat ground.

Some depth control devices utilize one or more wheels contacting the ground in advance of the implement, said wheels sensing the terrain and, in conjunction with other mechanism, controlling switches which increase or decrease the relative penetration of the earth working tools in order to maintain a preset depth.

These individual wheels suffer from several disadvantages, the principal one being that they tend to chatter or vibrate due to the unevenness of the terrain thus tripping the mechanism for depth control, when it is not really necessary to do so. Also, these wheels are sometimes difficult to steer when the implement is turned.

SUMMARY OF THE INVENTION

The present invention overcomes these disadvantages by providing a pair of wheels one behind the other which in effect act as a shoe and smooth out roughness of terrain in order to prevent the depth control mechanism from being actuated unnecessarily.

The novel wheel arrangement can be used with existing depth control devices or alternatively, can be incorporated in relatively simple novel control devices included in this application.

Furthermore, this type of wheel arrangement can also be used on other implements which have chatter and vibration problems such as sprayers, special trailers, and harrow carts.

One aspect of the invention is to provide, in an agricultural implement which includes a main frame, source of electrical power, a source of hydraulic power, a ground engaging element mounted in said frame and means to set the depth of penetration of said ground engaging element with the ground; the improvement which consists of first sensing means supported by said frame and engaging the surface of the ground in advance of said ground engaging element, to sense the contour of the surface of the ground over which said first sensing means passes, second sensing means mounted in said frame and being operatively connected to said ground engaging element to sense the change in depth penetration of said ground engaging element, and switch means in said frame operatively connected to said ground engaging element for raising and lowering same relative to said frame, said first and second sensing means being operatively connected to said switch means.

Another aspect of the invention is to provide a sensing means for agricultural implements which include a main frame, a source of electrical power, a source of hydraulic power, a ground engaging element mounted in said frame and means to set the depth of penetration of said ground engaging element with the ground; said first sensing means including a first ground engaging wheel, means mounting same for rotation and castoring action to said frame, a second ground engaging wheel journalled for rotation behind said first ground engaging wheel, link means extending rearwardly from said first ground engaging wheel for journalling said second ground engaging wheel for rotation, said link means being pivotally connected to said means mounting said first ground engaging wheel, for movement of said second ground engaging wheel in a vertical plane, and spring means extending between said means mounting said first ground engaging wheel and said link means intermediate the ends thereof, normally urging said second ground engaging wheel into contact with the surface of the ground.

Another aspect of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, our invention consists essentially in the arrangement and construction of parts all as hereinafter more particularly described, reference being had to the accompanying drawings in which:

DESCRIPTION OF THE DRAWINGS

FIG. 1 is a side elevation of one embodiment of the depth control mounted on a discer, part of which is sectioned and part of which is shown schematically.

FIG. 1A is an enlarged side elevation of the switching mechanism of FIG. 1.

FIG. 1B is an enlarged fragmentary top plan view of the switch actuators.

FIG. 2 is a schematic front elevation showing one embodiment of the ground engaging sensing means.

In the drawings like characters of reference indicate corresponding parts in the different figures.

DETAILED DESCRIPTION

Figure 3:
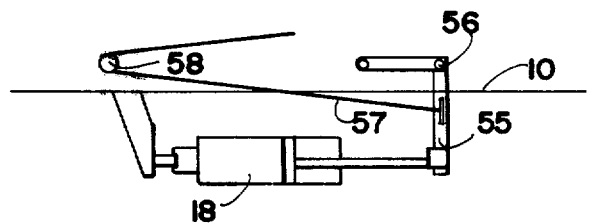
FIG. 3 is a fragmentary schematic view showing one method of raising and lowering the ground engaging sensing means.

Although this description and the drawings show the invention as applied to a discer, nevertheless it will be appreciated that it can be used with other implements as hereinbefore described and the ground engaging sensing means can be used with other depth control devices as well as with other implements which may have chatter and vibration problems.

Proceeding therefore to describe the invention in detail, reference should first be made to FIG. 1 in which 10 illustrates the main frame of an agricultural implement such as a discer, it being understood that various ground engaging wheels (not illustrated) support this main frame at either end.

Reference character 11 illustrates a disc partially engaging the ground and forming part of a disc gang, it being understood that there are usually several gangs of discs extending along the frame 10 and supported for rotation upon the ends of gang support arms 12 which in turn are pivoted to the rear of the main frame by means of pivot 13.

A rock shaft 14 is journalled within bearing 15 to the rear of the frame above the pivot 13 and one or more arms 16 extend from rock shaft 14 and are connected to the arm 12 by means of reset rams 17. Alternatively, spring loaded rods may extend between the arms 16 and 12.

A master cylinder or fluid operator 18 is shown in FIG. 3 and is operatively connected to the rock shaft 10 for rotating same. However, this master cylinder is not shown in FIG. 1 for clarity.

It is controlled by the operator and raises or lowers the disc gangs so that the depth of penetration of the discs 11 is set when use of the implement commences.

First sensing means collectively designated 19 are provided forwardly of the main frame 10 and second sensing means collectively designated 20 are operatively connected between the disc gang 11 and switch means collectively designated 21.

The first sensing means comprises a wheel fork 22 having a vertical shaft 23 extending upwardly therefrom and being journalled for rotation within the end of an arm 24. This shaft 23 journals the wheel fork 22 for castoring action around a vertical axis. A wheel spindle 25 journals a first ground engaging wheel 26 for rotation within the wheel fork and links 27 are pivoted to this spindle 25 and extend rearwardly and downwardly therefrom and carry a further spindle 28 in the distal ends thereof upon which is journalled for rotation, a second ground engaging wheel 29 and it will be observed that the diameter of this second wheel 29 is smaller than the diameter of the first wheel 26.

A shaft or rod 30 is pivoted to the links 27 intermediate the ends thereof and slidably engages a sheave 31 secured adjacent the upper ends of the wheel forks 22 and a compression spring 32 reacts between this sliding sheave and an anchor clamp 33 surrounding bar 20 so that pressure is applied via the bar 30 to the rear wheel 29, normally urging same into contact with the ground surface 34.

This assembly acts in the manner of a ski or shoe with wheel 26 acting as the leading wheel and wheel 29 acting as the follower wheel. This stabilizes the lead wheel and prevents it from shimmying or bouncing.

The aforementioned arm 24 is pivoted by the other end thereof to the frame 10 as indicated by reference character 35 and a rod 36 extends upwardly from the arm 24 and is secured thereto by a clamp 37 which is slidable along arm 24.

One arm 38 of a crank arm assembly is provided with a clevis 39 on the distal end thereof slidably engaging over rod 36 and a shock absorbing spring 40 surrounds the rod 36 and reacts against clevis 39. A cross pin 41 extends through the upper end of rod 36 and restrains the clevis 39 so that spring 40 acts as a shock absorber and has enough compression resistance to operate the switch means 21.

The crank arm is pivoted to the frame as indicated by reference character 42 with the other arm 43 extending upwardly and being secured as at 44, by the upper end thereof to one end of an arm 45 which forms part of the switching 21.

This arm 45 carries a pair of switches namely a "down" switch 46 and an "up" switch 47, having spring mounted actuators 46A and 47A respectively, depending therefrom.

A sleeve 48 is secured to arm 43 of the crank arm and acts as a guide for a second arm 49 which is situated substantially parallel to the first arm 45 of the switch means 21.

The other end of arm 49 is pivotally connected as indicated by reference character 50, to an arm 51 which is secured to and extends upwardly from the aforementioned rock shaft 14 and is actuated thereby. This arm 49 carries switch actuators 52 and 52' which engage the portions 46A and 47A respectively of the switches 46 and 47 as clearly shown in FIGS. 1A and 1B.

It will therefore be appreciated that vertical movement of the first sensor members 19 due to uneven ground contour and the like, moves arm 45 lengthwise thus actuating one or other of the switches 46 or 47 which are operatively connected to the main cylinder or fluid operator 18 thus lowering or raising the discs 11 and maintaining, within limits, the preset depth of penetration thereof.

By the same token, if the draft changes due to a difference in ground density, the discs 11 will raise or lower relative to the surface of the ground thus operating the second sensor means 20 and once again operating the switches which in turn actuates the main fluid operator 18 and turns the discs to the preset depth, once again within limits dictated by design parameters of the device.

Also, in the case of a seeder, a seed box 53 is usually mounted upon the main frame 10 and when fully loaded, applies a weight to the machine which affects the preset depth of the discs 11. As the seed is used, this weight decreases once again altering the depth of penetration of the discs which will be corrected by the second sensing means 20 and the master fluid operator 18.

In a relatively wide machine, it is desirable to have more than one first sensing means 19 under which circumstances, the movement thereof should be averaged before being connected to the switch means 21.

In FIG. 2, a pair of spaced apart first sensing means 19 are shown each being mounted upon an arm 24 having the vertical shafts or rods 36 and the shock absorber springs 40.

A cross member 54 extends between the upper ends of the rods 36 and the crank arm is connected centrally of the cross member 54 with the upper arm 43 extending upwardly and being connected to the switch assembly as hereinbefore described.

When it is desired to use the machine in transport, the main fluid operator 18 is actuated to raise the discs 11 clear of the ground completely and it is, of course, necessary and desirable to raise the first sensing means 19 clear of the ground also.

Reference to FIG. 3 will show that the main fluid operator is also connected to a link 55 pivoted as at 56, to the main frame 10. A flexible cable 57 is secured by one end thereof, intermediate the ends of link 55 and passes over a sheave 58 supported upon the main frame 10 and over a further sheave 59 supported, in this embodiment, upon the seed box 53. The cable then extends upwardly and downwardly to be connected by the other end thereof to the upper end of spindle 23 situated on the outboard end of arm 24 so that as the fluid operator extends in order to raise the discs 11 in the usual way, it also moves the arm 24 upwardly and raises the first sensing means clear of the ground. Conversely, when the discs are lowered for engagement within the ground, the first sensing means is lowered into position as shown in FIG. 1.

Figure 4:
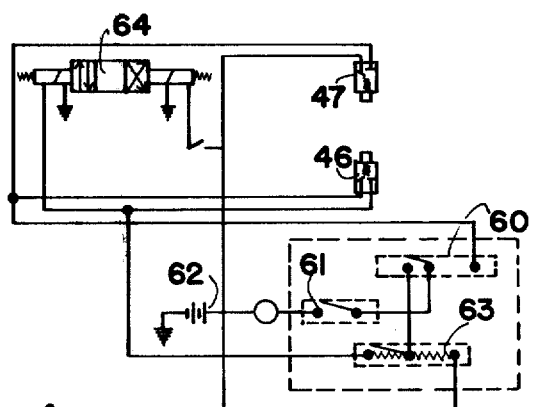
FIG. 4 is a schematic electrical diagram.

FIG. 4 shows one electrical schematic in which reference character 60 shows a single pull double throw switch which can be moved from the manual position to the automatic position and vice-versa.

A main switch 61 connects the circuit to the source of power 62.

A further single pull double throw switch 63 may be operated manually to raise and lower the discs 11.

However, when in the automatic position as is normal, the "up" switch 47 and the "down" switch 46 are connected in circuit and actuated as hereinbefore described. These are operatively connected by electrical connections to the source of power and to a double acting solenoid 64 which is connected to the hydraulic circuit and operates a main fluid operator 18.

Figure 5:
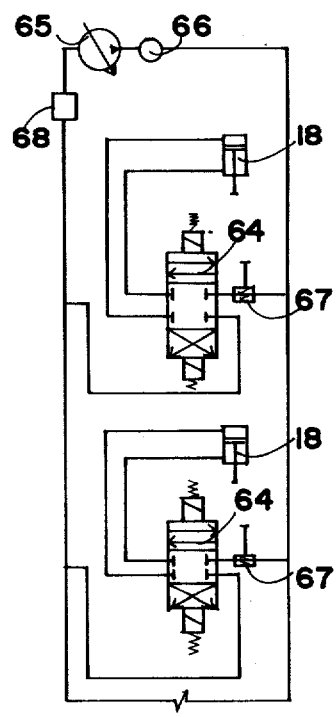
FIG. 5 is a schematic hydraulic diagram.

Reference to FIG. 5 will show the hydraulic circuit with these solenoids 64 which operate the valve portions of the solenoids and routes the hydraulic fluid to either side of the pistons of the fluid actuators 18.

In FIG. 5, the hydraulic fluid is pumped via pump 65, through filter 66, to flow resistor valves 67 which are provided in order to prevent hammering and are thence via the solenoid valves 64 to the fluid actuators 18 as clearly indicated, with return fluid being routed to the reservoir or tank 68.

Although the switch means 21, in this embodiment, consists of switches actuated by the blocks or actuators 52 and 52', nevertheless it will be appreciated that other forms of switches could be provided such as magnets and reed switches or transducers utilizing the "haul" effect with magnets to actuate the control valves.

In all instances, calibration of the depth control device can be accomplished by movement of the block 69 carrying the actuators 52 and 52' which can be moved slidably along arm 49 and adjusted as desired.

In conclusion, it is believed that the depth control is more effective than previous devices and in particular, the first sensing means 19 minimizes bounce, vibration, shimmy, thus giving a more accurate reading. This first sensing means can be used on such implements as sprayers, harrow bars or the like and can be adapted to other machines which can utilize either the control means of the present device or other depth control means. It can be utilized on hoe drills, seed drills, potato harvesters, beet harvesters, onion harvesters and the like.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. In an agricultural implement which includes a main frame, a ground engaging element mounted in said frame and means to set the depth of penetration of said ground engaging element with the ground; the improvement which consists of first sensing means supported by said frame and engaging the surface of the ground in advance of said ground engaging element, to sense the contour of the surface of the ground over which said first sensing means passes, second sensing means mounted in said frame and being operatively connected to said ground engaging element to sense the change in depth penetration of said ground engaging element, and control means in said frame operatively connected to said ground engaging element for raising and lowering same relative to said frame, said first and second sensing means being operatively connected to said control means, said first sensing means including a first ground engaging wheel, means mounting same for rotation and castoring action to said frame, a second ground engaging wheel journalled for rotation behind said first ground engaging wheel, link means extending rearwardly from said first ground engaging wheel for journalling and supporting said second ground engaging wheel for rotation, said link means being pivotally connected to said means mounting said first ground engaging wheel, for movement of said second ground engaging wheel in a vertical plane, and spring means extending between said means mounting said first ground engaging wheel and said link means intermediate the ends thereof, normally urging said second ground engaging wheel into contact with the surface of the ground.

2. The improvement according to claim 1 in which said means operatively connecting said first sensing means with said switch means includes a support bar pivotally connected by one end thereof to said frame, said first sensing means being supported adjacent the distal end of said support bar and extending downwardly therefrom, a crank arm pivoted to said frame and including a first and second arm extending at an angle from one another from a common locus, said first arm being operatively connected to said support arm, said second arm being operatively connected to said switch means.

3. The improvement according to claim 2 which includes means supporting said switch means relative to said frame, including a first bar, an "up" switch and a "down" switch mounted on said bar and being operatively connected to said means to set the depth of penetration of said ground engaging implement, a second bar spaced and parallel to said first bar, switch actuators on said second bar operatively engageable with said switches when said bars move lengthwise relative to one another, one of said bars being supported for sliding movement relative to the other of said bars, one of said bars being operatively connected to said second arm of said crank arm, the other of said bars being operatively connected to said ground engaging element.

4. The improvement according to claim 3 in which said means to set the depth of penetration of said ground engaging element includes means to raise said ground engaging element clear of the ground into transport position and means operatively extending between said means to set the depth of penetration, and said first sensing means to raise said first sensing means clear of the ground when said ground engaging element is raised clear of the ground and to lower said first sensing means in engagement with the surface of the ground when said ground engaging element is lowered for engagement with the ground.

5. The improvement according to claim 2 in which said means to set the depth of penetration of said ground engaging element includes means to raise said ground engaging element clear of the ground into transport position and means operatively extending between said means to set the depth of penetration, and said first sensing means to raise said first sensing means clear of the ground when said ground engaging element is raised clear of the ground and to lower said first sensing means in engagement with the surface of the ground when said ground engaging element is lowered for engagement with the ground.

6. The improvement according to claim 1 in which said means to set the depth of penetration of said ground engaging element includes means to raise said ground engaging element clear of the ground into transport position and means operatively extending between said means to set the depth of penetration, and said first sensing means to raise said first sensing means clear of the ground when said ground engaging element is raised clear of the ground and to lower said first sensing means in engagement with the surface of the ground when said ground engaging element is lowered for engagement with the ground.

7. A first sensing means for agricultural implements, a ground engaging element attachable to said implement and means to set the depth of penetration of said ground engaging element with the ground; said first sensing means including a first ground engaging wheel, means mounting same for rotation and castoring action, a second ground engaging wheel journalled for rotation behind and in alignment with said first ground wheel, link means extending rearwardly from said first ground engaging wheel for journalling said second ground engaging wheel for rotation, said link means being pivotally connected to said means mounting said first ground engaging wheel, for movement of said second ground engaging wheel in a vertical plane, and spring means extending between said means mounting said first ground engaging wheel and said link means intermediate the ends thereof, normally urging said second ground engaging wheel into contact with the surface of the ground, said means mounting said first ground engaging wheel including a wheel fork, a spindle spanning said fork, said wheel being journalled for rotation upon said spindle, a fork mounting shaft extending upwardly from said fork, means mounting said fork mounting shaft for castoring action of said first sensing means, said spring means including a rod pivotally connected by one end thereof to said link means, a sliding clevis secured to said wheel fork adjacent the upper end thereof, said rod slidably engaging said sliding clevis and a compression spring reacting between said sliding clevis and anchor means on said rod.

8. In an agricultural implement which includes a main frame, a ground engaging element mounted in said frame and means to set the depth of penetration of said ground engaging element with the ground; the improvement which consists of first sensing means supported by said frame and engaging the surface of the ground in advance of said ground engaging element, to sense the contour of the surface of the ground over which said first sensing means passes, second sensing means mounted in said frame and being operatively connected to said ground engaging element to sense the change in depth penetration of said ground engaging element, and switch means in said frame operatively connected to said ground engaging element for raising and lowering same relative to said frame, said first and second sensing means being operatively connected to said switch means, said means operatively connecting said first sensing means with said switch means includes a support bar pivotally connected by one end thereof to said frame, said first sensing means being supported adjacent the distal end of said support bar and extending downwardly therefrom, a crank arm pivoted to said frame and including a first and second arm extending at an angle from one another from a common locus, said first arm being operatively connected to said support arm, said second arm being operatively connected to said switch means.

9. The improvement according to claim 8 which includes means supporting said switch means relative to said frame, including a first bar, an "up" switch and a "down" switch mounted on said bar and being operatively connected to said means to set the depth of penetration of said ground engaging implement, a second bar spaced and parallel to said first bar, switch actuators on said second bar operatively engageable with said switches when said bars move lengthwise relative to one another, one of said bars being supported for sliding movement relative to the other of said bars, one of said bars being operatively connected to said second arm of said crank arm, the other of said bars being operatively connected to said ground engaging element.

10. The improvement according to claim 6 in which said means to set the depth of penetration of said ground engaging element includes means to raise said ground engaging element clear of the ground into transport position and means operatively extending between said means to set the depth of penetration, and said first sensing means to raise said first sensing means clear of the ground when said ground engaging element is raised clear of the ground and to lower said first sensing means in engagement with the surface of the ground when said ground engaging element is lowered for engagement with the ground.

* * * * *